US009471790B2

(12) United States Patent
Tripp

(10) Patent No.: US 9,471,790 B2
(45) Date of Patent: *Oct. 18, 2016

(54) REMEDIATION OF SECURITY VULNERABILITIES IN COMPUTER SOFTWARE

(71) Applicant: International Business Machines Corporation, Armonk, NY (US)

(72) Inventor: Omer Tripp, Bronx, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/073,258

(22) Filed: Mar. 17, 2016

(65) Prior Publication Data

US 2016/0196434 A1  Jul. 7, 2016

Related U.S. Application Data

(63) Continuation of application No. 14/024,730, filed on Sep. 12, 2013, now Pat. No. 9,298,926, which is a continuation of application No. 13/647,711, filed on Oct. 9, 2012, now Pat. No. 9,292,693.

(51) Int. Cl.
*G06F 21/57* (2013.01)
*G06F 21/54* (2013.01)

(52) U.S. Cl.
CPC .............. *G06F 21/577* (2013.01); *G06F 21/54* (2013.01); *G06F 2221/033* (2013.01)

(58) Field of Classification Search
None
See application file for complete search history.

(56) References Cited

U.S. PATENT DOCUMENTS 7,293,175 B2 * 11/2007 Brown ............... G06F 21/62
  713/166
7,530,107 B1   5/2009 Ono et al.
7,945,958 B2   5/2011 Amarasinghe et al.
8,572,747 B2 * 10/2013 Berg .................. G06F 21/577
  717/127
8,667,584 B2 *  3/2014 Berg .................. G06F 21/50
  726/22
8,701,186 B2 *  4/2014 Berg .................. G06F 21/50
  726/22

(Continued)

OTHER PUBLICATIONS

Saxena, P. et al., "ScriptGard: Automatic Context-Sensitive Sanitization for Large-Scale Legacy Web Applications", COS'1, Oct. 17-27, 2011, Chicago, Illinois, USA. Copyright 2011 ACM.*

(Continued)

*Primary Examiner* — Andrew Nalven
*Assistant Examiner* — Christopher Ruprecht
(74) *Attorney, Agent, or Firm* — Cuenot, Forsythe & Kim, LLC

(57) ABSTRACT

Processing a downgrader specification by constructing a set of candidate downgrader placement locations found within a computer software application, where each of the candidate downgrader placement locations corresponds to a transition between a different pair of instructions within the computer software application, and where each of the transitions participates in any of a plurality of data flows in a set of security-sensitive data flows within the computer software application, applying a downgrader specification to the set of candidate downgrader placement locations, and determining that the downgrader specification provides full coverage of the set of security-sensitive data flows within the computer software application if at least one candidate downgrader placement location within each of the security-sensitive data flows is a member of the set of candidate downgrader placement locations.

9 Claims, 5 Drawing Sheets

(56) References Cited

U.S. PATENT DOCUMENTS

| | | | |
|---|---|---|---|
| 8,769,696 B2* | 7/2014 | Pistoia | G06F 21/00 380/29 |
| 8,850,405 B2* | 9/2014 | Fink | G06F 8/77 717/131 |
| 8,863,292 B2* | 10/2014 | Pistoia | G06F 8/43 726/25 |
| 8,875,297 B2* | 10/2014 | Pistoia | G06F 8/43 726/25 |
| 8,881,300 B2* | 11/2014 | Pistoia | G06F 21/00 380/33 |
| 8,954,725 B2* | 2/2015 | Singh | H04L 63/0254 713/151 |
| 9,292,693 B2 | 3/2016 | Tripp | |
| 9,298,926 B2 | 3/2016 | Tripp | |
| 2002/0073313 A1* | 6/2002 | Brown | G06F 21/62 713/165 |
| 2006/0282897 A1 | 12/2006 | Sima et al. | |
| 2007/0074188 A1 | 3/2007 | Huang et al. | |
| 2008/0184208 A1 | 7/2008 | Sreedhar et al. | |
| 2008/0209567 A1 | 8/2008 | Lockhart et al. | |
| 2009/0183137 A1 | 7/2009 | Ponnath | |
| 2009/0282393 A1 | 11/2009 | Costa et al. | |
| 2009/0282480 A1 | 11/2009 | Lee et al. | |
| 2010/0083240 A1 | 4/2010 | Siman | |
| 2010/0287613 A1* | 11/2010 | Singh | H04L 63/0254 726/22 |
| 2011/0030061 A1 | 2/2011 | Artzi et al. | |
| 2011/0087892 A1 | 4/2011 | Haviv et al. | |
| 2011/0131656 A1 | 6/2011 | Haviv et al. | |
| 2011/0197180 A1 | 8/2011 | Huang et al. | |
| 2012/0131668 A1* | 5/2012 | Berg | G06F 21/577 726/22 |
| 2012/0151592 A1* | 6/2012 | Veanes | G06F 21/51 726/25 |
| 2012/0159619 A1* | 6/2012 | Berg | G06F 21/50 726/22 |
| 2012/0167209 A1 | 6/2012 | Molnar et al. | |
| 2012/0216177 A1* | 8/2012 | Fink | G06F 8/77 717/131 |
| 2012/0260344 A1 | 10/2012 | Maor et al. | |
| 2013/0086676 A1 | 4/2013 | Chess et al. | |
| 2013/0086686 A1* | 4/2013 | Pistoia | G06F 21/00 726/25 |
| 2013/0086687 A1 | 4/2013 | Chess et al. | |
| 2013/0091578 A1 | 4/2013 | Bisht et al. | |
| 2013/0111310 A1 | 5/2013 | De Oliveira et al. | |
| 2013/0152204 A1* | 6/2013 | Pistoia | G06F 8/43 726/25 |
| 2013/0152205 A1* | 6/2013 | Pistoia | G06F 8/43 726/25 |
| 2013/0179978 A1* | 7/2013 | Pistoia | G06F 21/00 726/25 |
| 2013/0205391 A1* | 8/2013 | Berg | G06F 21/50 726/22 |
| 2014/0101756 A1 | 4/2014 | Tripp | |
| 2014/0101769 A1 | 4/2014 | Tripp | |

OTHER PUBLICATIONS

Abadi, A. et al., "Automatically Fixing Security Vulnerabilities in Java Code", SPLASH '11 Proceedings of the ACM International conference companion on Object oriented programming systems languages and applications companion, pp. 3-4, Oct. 22-27, 2011.

Balzarotti, D. et al., "Saner: Composing Static and Dynamic Aanalysis to Validate Sanitization in Web Applications," In IEEE Symposium on Security and Privacy, SP 2008, pp. 387-401, 2008.
Bisht, P. et al., "CANDID: Dynamic Candidate Evaluations for Automatic Prevention of SQL Injection Attacks," In ACM Transactions on Information and System Security (TISSEC), vol. 13, No. 2, Art, 14, Feb. 2010.
Hooimeijer, P. et al., "Fast and Precise Sanitizer Analysis With BEK," In Proceedings of the 20th USENIX Conference on Security, USENIX Association, 16 pg., 2011.
Vechev, M. et al., "Abstraction-guided synthesis of synchronization", POPL'10 Proceedings of the 37th annual ACM SIGPLAN-SIGACT symposium on Principles of programming languages, pp. 327-338, Jan. 17-23, 2009.
Kuperstein, M. et al., "Partial-coherence abstractions for relaxed memory models", PLDI'11 Proceedings of the 32nd ACM SIGPLAN conference on Programming language design and implementation, pp. 187-198, Jun. 4-8, 2011.
Livshits, B. et al., "MERLIN: Specification inference for explicit information-flow problems", PLDI '09 Proceedings of the 2009 ACM SIGPLAN conference on Programming language design and implementation, pp. 75-86, Jun. 15-20, 2009.
Le, W. et al., "Generating Analyses for Detecting Faults in Path Segments", ISSTA '11 Proceedings of the 2011 International Symposium on Software Testing and Analysis, pp. 320-330, Jul. 17-21, 2011.
Mui, R. et al., "Preventing SQL Injection through Automatic Query Sanitization with ASSIST," In Proceedings Fourth International Workshop on Testing, Analysis and Verification of Web Software (TAV-WEB 2010), Sep. 21, 2010, 12 pg.
Muthukumaran, D. et al., "Cut Me Some Security," In Proceedings of the 3rd ACM workshop on Assurable and Usable Security Configuration, pp. 75-78. ACM, 2010.
King, D. et al., "Automating Security Mediation Placement," In Programming Languages and Systems, pp. 327-344, Springer Berlin Heidelberg, 2010.
Lelarge, M. et al., "Automatic Composition of Secure Workflows," In Autonomic and Trusted Computing, pp. 322-331. Springer Berlin Heidelberg, 2006.
Tateishi, T. et al., "Path-and Index-Sensitive String Aanalysis Based on Monadic Second-Order Logic," In Proceedings of the 2011 International Symposium on Software Testing and Analysis, pp. 166-176. ACM, Feb. 2011.
Livshits, B., "Dynamic Taint Tracking in Managed Runtimes," Technical Report MSR-TR-2012-114, Microsoft Research, 18 pg., 2012.
Vechev, M. et al., "Abstraction-Guided Synthesis of Synchronization," In ACM Sigplan Notices, vol. 45, No. 1, pp. 327-338, ACM, 2010.
U.S. Appl. No. 13/647,711, Non-Final Office Action, Oct. 2, 2014, 51 pg.
U.S. Appl. No. 13/647,711, Final Office Action, Mar. 11, 2015, 49 pg.
U.S. Appl. No. 13/647,711, Notice of Allowance, Dec. 9, 2015, 16 pg.
U.S. Appl. No. 14/024,730, Non-Final Office Action, Oct. 3, 2014, 54 pg.
U.S. Appl. No. 14/024,730, Final Office Action, Mar. 12, 2015, 51 pg.
U.S. Appl. No. 14/024,730, Notice of Allowance, Dec. 14, 2015, 14 pg.

* cited by examiner

REMEDIATION OF SECURITY VULNERABILITIES IN COMPUTER SOFTWARE

FIELD OF THE INVENTION

The invention relates to computer software analysis in general, and more particularly to remediation of security vulnerabilities in computer software.

BACKGROUND OF THE INVENTION

Static analysis tools are often used by computer software developers to provide information about computer software while applying only static considerations (i.e., without executing a computer software application). In one type of static analysis, data flows are traced within a computer software application from "sources," being application programming interfaces (API) that introduce "untrusted" input into a program, such as user input, to "sinks," being security-sensitive operations such as modifying a database. Such flows are identified as security vulnerabilities that may require remediation, typically by ensuring that a flow that is identified as a security vulnerability encounters a "downgrader" that validates and/or sanitizes untrusted input, such as by checking whether the input contains illegal characters or is in an illegal format, both common tactics used in malicious attacks. Static analysis tools that identify security vulnerabilities typically provide computer software developers with a short description of each type of security vulnerability found, and may even provide sample code snippets that may be used by the developer to construct a downgrader for remediating the security vulnerability.

In addition to identifying a security vulnerability and deciding what type of downgrader to use for its remediation, deciding where to locate a downgrader within a data flow is a matter of importance as well. Misplacement of a downgrader may leave the original security vulnerability in place or cause other problems. Also, in order to maximize code quality and maintainability, it is desirable to apply as few code changes as possible.

SUMMARY OF THE INVENTION

In one aspect of the invention a method is provided for processing a downgrader specification, the method including constructing a set of candidate downgrader placement locations found within a computer software application, where each of the candidate downgrader placement locations corresponds to a transition between a different pair of instructions within the computer software application, and where each of the transitions participates in any of a plurality of data flows in a set of security-sensitive data flows within the computer software application, applying a downgrader specification to the set of candidate downgrader placement locations, and determining that the downgrader specification provides full coverage of the set of security-sensitive data flows within the computer software application if at least one candidate downgrader placement location within each of the security-sensitive data flows is a member of the set of candidate downgrader placement locations.

In another aspect of the invention a method is provided for processing a downgrader specification, the method including constructing a set of candidate downgraders for processing a set of security-sensitive data flows within a computer software application, where each of the security-sensitive data flows is processable by at least one of the candidate downgraders, applying a downgrader specification to the set of candidate downgraders, and determining that the downgrader specification provides full coverage of the set of security-sensitive data flows within the computer software application if each of the security-sensitive data flows is processable by at least one of the candidate downgraders remaining in the set of candidate downgraders.

In other aspects of the invention systems and computer program products embodying the invention are provided.

BRIEF DESCRIPTION OF THE DRAWINGS

The invention will be understood and appreciated more fully from the following detailed description taken in conjunction with the appended drawings in which.

DETAILED DESCRIPTION OF THE INVENTION

Figure 1:
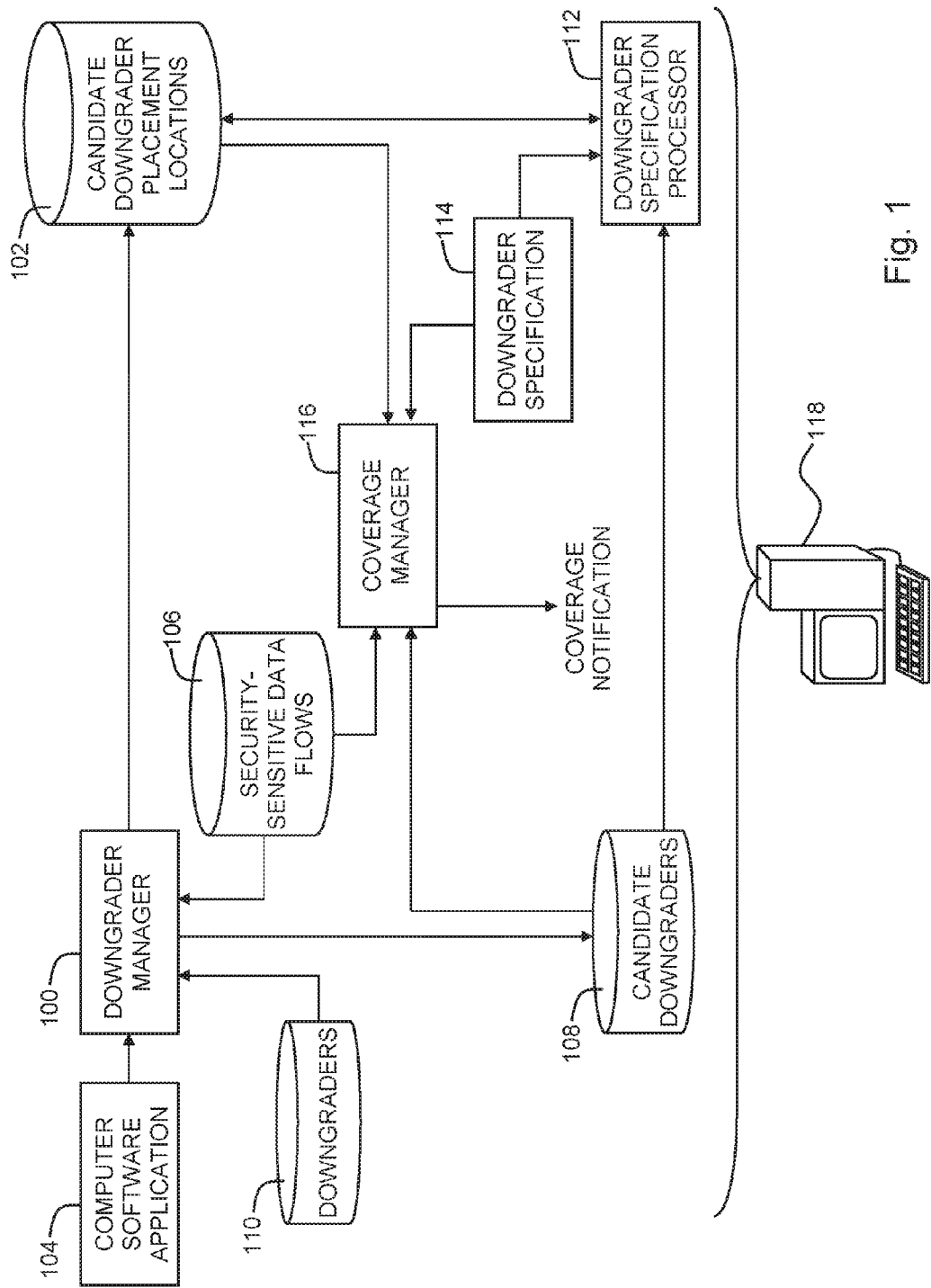
FIG. 1 is a simplified conceptual illustration of a system for remediation of security vulnerabilities in computer software, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a system for remediation of security vulnerabilities in computer software, constructed and operative in accordance with an embodiment of the invention. In the system of FIG. 1, a downgrader manager 100 is configured to construct a set 102 of candidate downgrader placement locations found within a computer software application 104. Each of the candidate downgrader placement locations in set 102 corresponds to a transition between a different pair of instructions within computer software application 104, and each of the transitions participates in one or more data flows in a set 106 of security-sensitive data flows within computer software application 104, such as where the security-sensitive data flows were identified using conventional static analysis techniques. Downgrader manager 100 is additionally or alternatively configured to construct a set 108 of candidate downgraders for processing any, and preferably all, of the security-sensitive data flows in set 106, preferably where each of the security-sensitive data flows in set 106 is processable by at least one of the candidate downgraders in set 108. Downgrader specification processor 108 is preferably configured to construct set 108 by selecting candidate downgraders from a predefined set of downgraders 110.

A downgrader specification processor 112 is configured to eliminate from set 102 of candidate downgrader placement locations any of the candidate downgrader placement locations whose elimination is indicated by a downgrader specification 114. Downgrader specification 114 may be predefined for use with any computer software application or user-defined to be specifically adapted for use with a particular computer software application, or predefined in part and user-defined in part. Downgrader specification 114 may, for example, indicate that downgraders are to be placed in particular modules or layers of a computer software application, and therefore candidate downgrader placement locations in set 102 that are not in the indicated modules or layers are to be eliminated from set 102. Downgrader specification 114 may, for example, additionally or alternatively indicate that downgraders may not be placed in certain areas in the computer software application code, and therefore candidate downgrader placement locations in set 102 that are located in the indicated areas are to be eliminated from set 102. Downgrader specification 114 may, for example, additionally or alternatively indicate that downgraders be placed at most n instruction steps away from a code location where the untrusted data is read and/or m instruction steps away from a security-sensitive operation, and therefore candidate downgrader placement locations in set 102 that are not within the indicated distances are to be eliminated from set 102. Downgrader specification processor 112 is alternatively or additionally configured to eliminate from the set 108 of candidate downgraders any of the candidate downgraders whose elimination is indicated by downgrader specification 114. Downgrader specification 114 may, for example, require that only specified downgraders be used, like java.net.URLEncoder or the Jakarta StringEscapeUtils class, no more than n distinct downgraders be used for an entire application and/or for a particular module, only validators be used, and not sanitizers, where sanitizers are capable of modifying invalid input strings whereas validators are not, or any combination of the above. Downgrader specification processor 112 is additionally or alternatively configured to eliminate any user-specified downgraders whose elimination is indicated by downgrader specification 114.

A coverage manager 116 is configured to determine whether or not downgrader specification 114 provides full coverage of set 106 of security-sensitive data flows within computer software application 104. If, after downgrader specification processor 112 has processed downgrader specification 114 as described hereinabove, at least one candidate downgrader placement location within each of the security-sensitive data flows in set 106 is a member of set 102 of candidate downgrader placement locations, then downgrader specification 114 provides full coverage of set 106 of security-sensitive data flows within computer software application 104. Otherwise, if downgrader specification 114 is configured such that all of the candidate downgrader placement locations within any of the security-sensitive data flows in set 106 have been eliminated from set 102 of candidate downgrader placement locations, then downgrader specification 114 does not provide full coverage of set 106 of security-sensitive data flows within computer software application 104. Coverage manager 116 is additionally or alternatively configured to determine that downgrader specification 114 provides full coverage of the set 106 of security-sensitive data flows within the computer software application if each of the security-sensitive data flows is processable by at least one of the candidate downgraders remaining in the set 108 of candidate downgraders. Coverage manager 116 is preferably configured to report, such as via a computer output device (not shown), whether or not downgrader specification 114 provides full coverage of set 106, preferably indicating which aspects of downgrader specification 114 resulted in less than full coverage and/or which security-sensitive data flows are not covered by downgrader specification 114.

Any of the elements shown in FIG. 1 are preferably implemented by one or more computers, such as a computer 118, in computer hardware and/or in computer software embodied in a non-transitory, computer-readable medium in accordance with conventional techniques.

Figure 2:
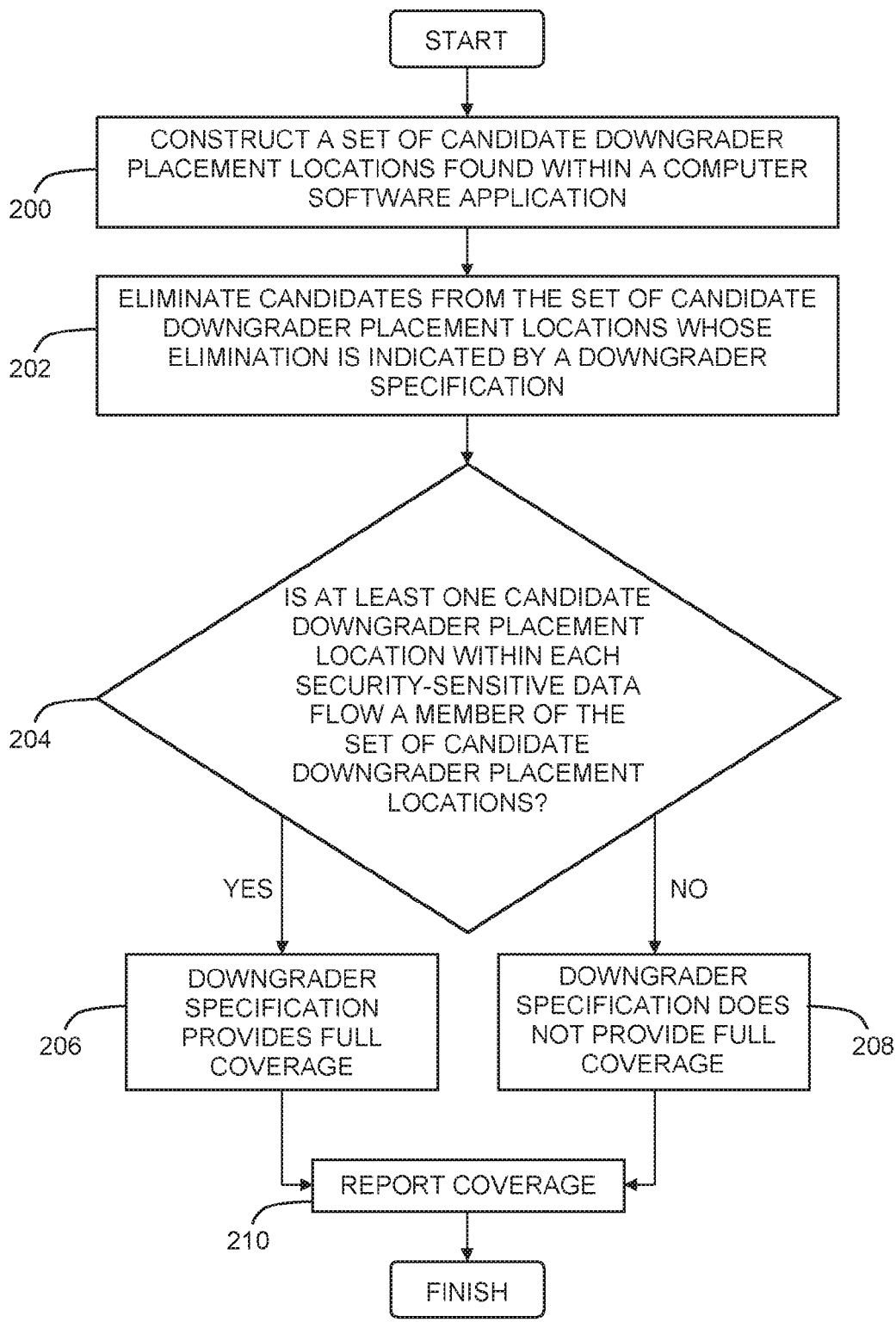
FIG. 2 is a simplified flowchart illustration of an exemplary method of operation of the system of FIG. 1, operative in accordance with an embodiment of the invention.

Reference is now made to FIG. 2, which is a simplified flowchart illustration of an exemplary method of operation of the system of FIG. 1, operative in accordance with an embodiment of the invention. In the method of FIG. 2 a set is constructed of candidate downgrader placement locations found within a computer software application (step 200). Each of the candidate downgrader placement locations in the set corresponds to a transition between a different pair of instructions within the computer software application, and each of the transitions participates in one or more data flows in a set of security-sensitive data flows within the computer software application, such as where the security-sensitive data flows were identified using conventional static analysis techniques. Candidate downgrader placement locations are eliminated from the set of candidate downgrader placement locations if their elimination is indicated by a downgrader specification (step 202). If at least one candidate downgrader placement location within each of the security-sensitive data flows is a member of the set of candidate downgrader placement locations (step 204), then it is determined that the downgrader specification provides full coverage of the set of security-sensitive data flows within the computer software application (step 206). Otherwise, it is determined that the downgrader specification does not provide full coverage of the set of security-sensitive data flows within the computer software application (step 208). The coverage determination is preferably reported (step 210), preferably indicating which aspects of the downgrader specification resulted in less than full coverage and/or which security-sensitive data flows are not covered by the downgrader specification.

It is noted that step 202 need not be performed if, when constructing the set of candidate downgrader placement locations, a candidate downgrader placement location is included in the set if its membership in the set is indicated by the downgrader specification.

Figure 3:
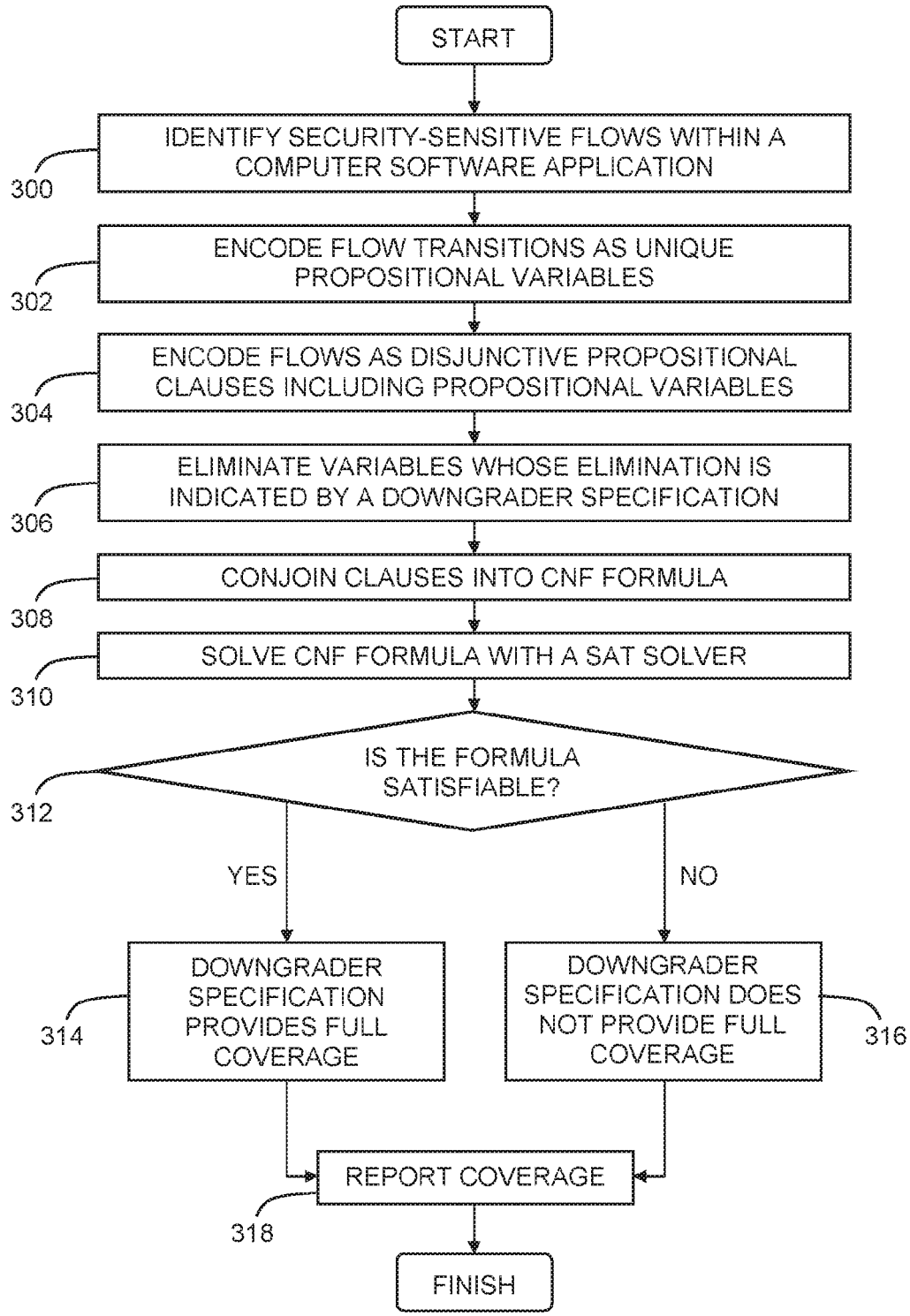
FIG. 3 is a simplified flowchart illustration of an exemplary implementation of the system of FIG. 1 and method of FIG. 2.

Reference is now made to FIG. 3, which is a simplified flowchart illustration of an exemplary implementation of the system of FIG. 1 and method of FIG. 2, operative in accordance with an embodiment of the invention. In the method of FIG. 3, static security analysis of a computer software application is performed, during which analysis a data propagation graph is computed and a set of security-sensitive data flows is identified (step 300). Each transition that participates in one or more security-sensitive data flows in the data propagation graph is encoded as a unique propositional variable (step 302). Each of the security-sensitive data flows is encoded as a disjunctive propositional clause, where the clause includes all propositional variables corresponding to the transitions that participate in the data flow (step 304). Variables corresponding to transitions whose elimination are indicated by a downgrader specification are eliminated (step 306). The clauses are conjoined to form a Conjunctive Normal Form (CNF) formula (step 308) which is then processed by a satisfiability (SAT) solver (step 310). If the formula is satisfiable (step 312) then it is determined that the downgrader specification provides full coverage of the set of security-sensitive data flows within the computer software application (step 314). Otherwise, it is determined that the downgrader specification does not provide full coverage of the set of security-sensitive data flows within the computer software application (step 316). The coverage determination is preferably reported (step 318), preferably indicating which aspects of the downgrader specification resulted in less than full coverage and/or which security-sensitive data flows are not covered by the downgrader specification.

Figure 4:
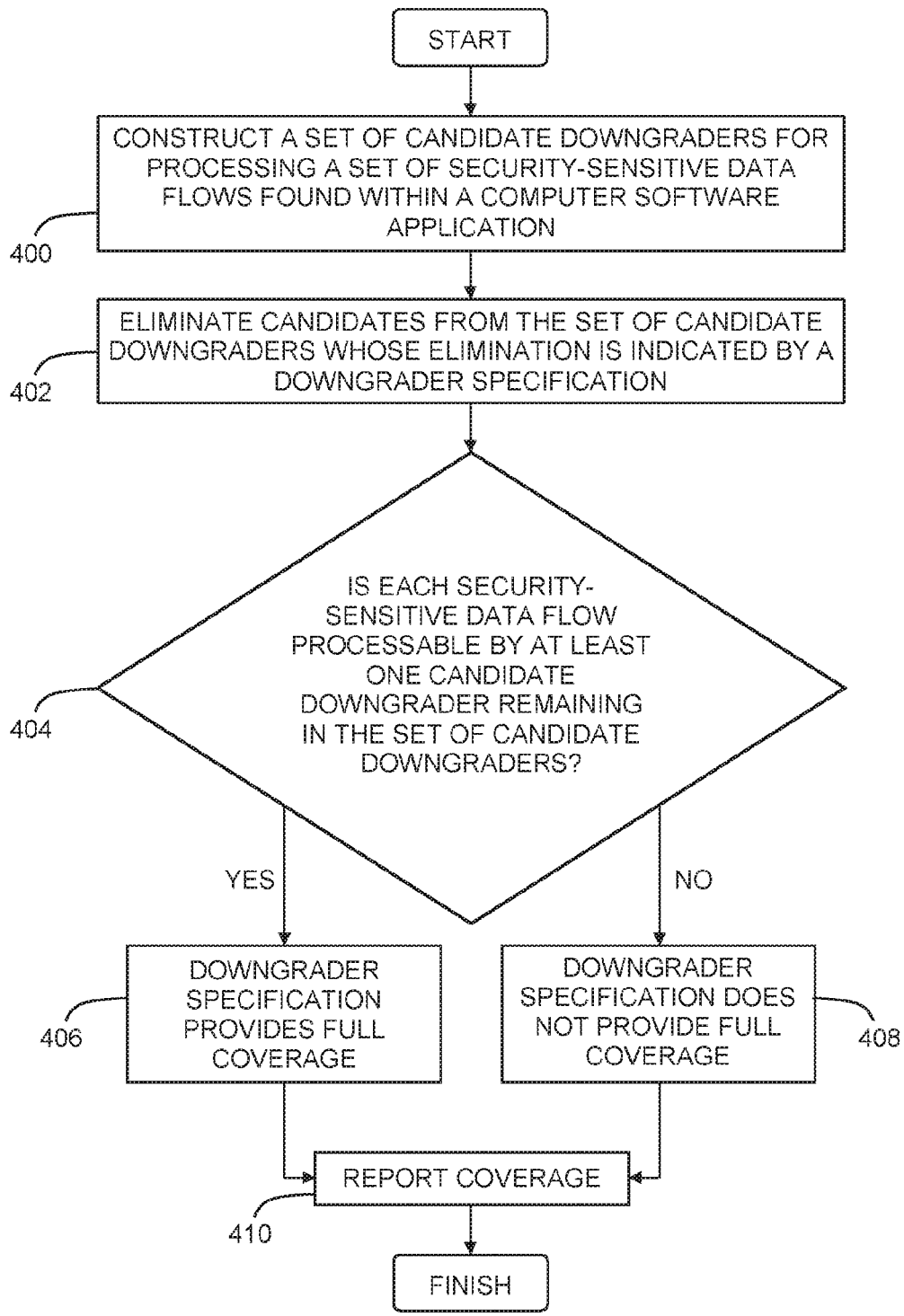
FIG. 4 is a simplified flowchart illustration of an exemplary method of operation of the system of FIG. 1, operative in accordance with an embodiment of the invention.

Reference is now made to FIG. 4, which is a simplified flowchart illustration of an exemplary method of operation of the system of FIG. 1, operative in accordance with an embodiment of the invention. In the method of FIG. 4 a set is constructed of candidate downgraders for processing any, and preferably all, of the security-sensitive data flows found within a computer software application (step 400), preferably where each of the security-sensitive data flows is processable by at least one of the candidate downgraders. Candidate downgraders are eliminated from the set of candidate downgraders if their elimination is indicated by a downgrader specification (step 402). If each of the security-sensitive data flows is processable by at least one of the candidate downgraders remaining in the set of candidate downgraders (step 404), then it is determined that the downgrader specification provides full coverage of the set of security-sensitive data flows within the computer software application (step 406). Otherwise, it is determined that the downgrader specification does not provide full coverage of the set of security-sensitive data flows within the computer software application (step 408). The coverage determination is preferably reported (step 410), preferably indicating which aspects of the downgrader specification resulted in less than full coverage and/or which security-sensitive data flows are not covered by the downgrader specification.

It is noted that step 402 need not be performed if, when constructing the set of candidate downgraders, a candidate downgrader is included in the set if its membership in the set is indicated by the downgrader specification.

It will be appreciated that the methods of FIG. 2 and FIG. 4 may be combined where both candidate downgraders and candidate downgrader placement locations may be determined with respect to a downgrader specification as described herein.

Figure 5:
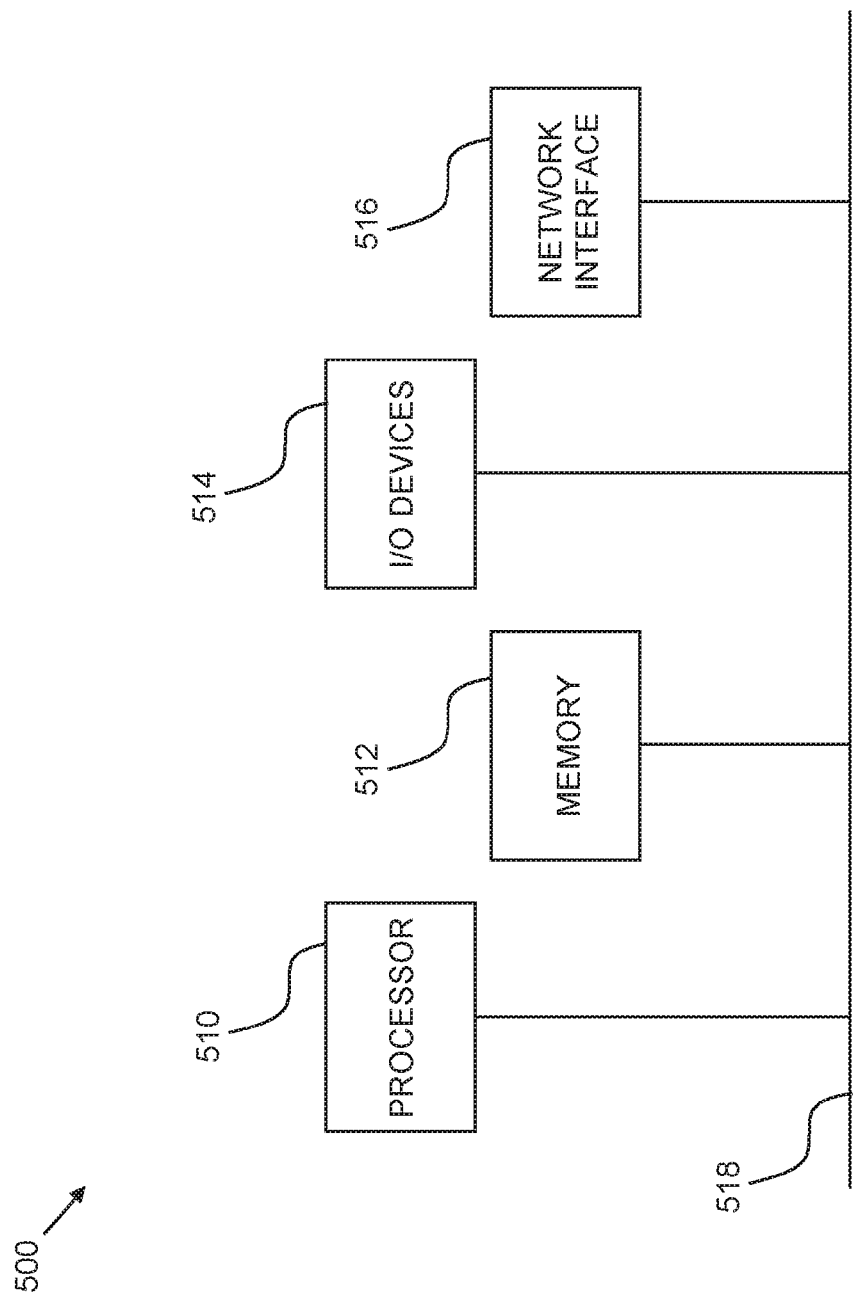
FIG. 5 is a simplified block diagram illustration of an exemplary hardware implementation of a computing system, constructed and operative in accordance with an embodiment of the invention.

Referring now to FIG. 5, block diagram 500 illustrates an exemplary hardware implementation of a computing system in accordance with which one or more components/methodologies of the invention (e.g., components/methodologies described in the context of FIGS. 1-4) may be implemented, according to an embodiment of the invention.

As shown, the techniques for controlling access to at least one resource may be implemented in accordance with a processor 510, a memory 512, I/O devices 514, and a network interface 516, coupled via a computer bus 518 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A computer-implemented method, comprising:
constructing, for a computer software application, an initial set of candidate downgrader placement locations;
identifying, for the computer software application, a set of security-sensitive data flows;
generating, by reducing the initial set of candidate downgrader placement locations using a downgrader specification, a reduced set of candidate downgrader placement locations; and
determining, based upon each of the data flows in the security of security-sensitive data flows including at least one candidate downgrader placement location in the reduced set of candidate downgrader placement locations, that the downgrader specification provides full coverage of the set of security-sensitive data flows, wherein
each of the candidate downgrader placement locations corresponds to a transition between a different pair of instructions within the computer software application, and
each of the transitions participates in at least one of the data flows in the set of security-sensitive data flows.

2. The method of claim 1, wherein
the downgrader specification indicates downgrader placement locations to eliminate.

3. The method of claim 1, wherein
the downgrader specification is defined by a computer user.

4. The method of claim 1, wherein
the downgrader specification indicates areas of the computer software application in which downgraders are not to be placed.

5. The method of claim 1, wherein
the downgrader specification indicates that downgraders be placed within a predefined number of instruction steps from a code location within the computer software application where untrusted data is read.

6. The method of claim 1, wherein
the downgrader specification indicates that downgraders be placed within a predefined number of instruction steps from a security-sensitive operation within the computer software application.

7. A computer-implemented method, comprising:
identifying, for a computer software application, a set of security-sensitive data flows;
constructing, for the computer software application, an initial set of candidate downgraders for processing the set of security-sensitive data flows;
generating, by reducing the initial set of candidate downgraders using a downgrader specification, a reduced set of candidate downgraders; and
determining, based upon each of the data flows in the security of security-sensitive data flows being processable by at least one candidate downgrader in the reduced set of candidate downgraders, that the downgrader specification provides full coverage of the set of security-sensitive data flows.

8. The method of claim 7, wherein
the downgrader specification indicates downgraders to eliminate.

9. The method of claim 7, wherein
the downgrader specification indicates areas of the computer software application in which downgraders are not to be placed.

* * * * *